United States Patent
Miyake (10) Patent No.: US 9,818,996 B2
(45) Date of Patent: Nov. 14, 2017

(54) SOLID BATTERY AND METHOD FOR MANUFACTURING SOLID BATTERY

(75) Inventor: Hideaki Miyake, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 94 days.

(21) Appl. No.: 14/003,017

(22) PCT Filed: Mar. 17, 2011

(86) PCT No.: PCT/JP2011/056427
§ 371 (c)(1),
(2), (4) Date: Sep. 4, 2013

(87) PCT Pub. No.: WO2012/124108
PCT Pub. Date: Sep. 20, 2012

(65) Prior Publication Data
US 2013/0344357 A1 Dec. 26, 2013

(51) Int. Cl.
*H01M 2/12* (2006.01)
*H01M 2/02* (2006.01)
(Continued)

(52) U.S. Cl.
CPC .......... *H01M 2/12* (2013.01); *H01M 2/0267* (2013.01); *H01M 6/48* (2013.01); *H01M 10/044* (2013.01); *H01M 10/0562* (2013.01); *H01M 10/0585* (2013.01); *H01M 10/34* (2013.01); *H01M 2/08* (2013.01); *H01M 2/14* (2013.01); *Y10T 29/4911* (2015.01)

(58) Field of Classification Search
None
See application file for complete search history.

(56) References Cited

U.S. PATENT DOCUMENTS 5,591,540 A * 1/1997 Louie .................... B32B 27/32
428/35.2
2011/0206957 A1* 8/2011 Byun .............................. 429/56

FOREIGN PATENT DOCUMENTS

CN 1189246 A 7/1998
JP A-2008-140633 6/2008
(Continued)

OTHER PUBLICATIONS

Hosaka et al. (JP, 2008-140633) (a raw machine translation) (Abstract & Detailed Description) (Jun. 19, 2008).*

Primary Examiner — Miriam Stagg
Assistant Examiner — Carmen Lyles-Irving
(74) Attorney, Agent, or Firm — Oliff PLC (57) ABSTRACT

Provided are: a solid battery which has been sealed in an exterior material under a reduced pressure, wherein gas in the exterior material can be fully removed when depressurizing the inside of the exterior material; and a method of manufacturing the solid battery, the solid battery having a single cell having: a laminated body having a cathode layer, an anode layer, and an electrolyte layer disposed between the cathode layer and the anode layer; an insulating part disposed on an outer perimeter of the laminated body in a cross-sectional view of the laminated body in a direction orthogonal to a lamination direction thereof, and a pair of current collectors sandwiching the laminated body and the insulating part, wherein the single cell has been sealed in an exterior material under a reduced pressure; and the insulating part has vent holes.

1 Claim, 4 Drawing Sheets

(51) Int. Cl.
*H01M 6/48* (2006.01)
*H01M 10/04* (2006.01)
*H01M 10/0585* (2010.01)
*H01M 10/34* (2006.01)
*H01M 10/0562* (2010.01)
H01M 2/14 (2006.01)
H01M 2/08 (2006.01)

(56) References Cited

FOREIGN PATENT DOCUMENTS

JP   A-2009-199912   9/2009
WO   97/01869 A1    1/1997

\* cited by examiner

SOLID BATTERY AND METHOD FOR MANUFACTURING SOLID BATTERY

TECHNICAL FIELD

The present invention relates to a solid battery having a single cell sealed in an exterior material under a reduced pressure, and a method for manufacturing the solid battery.

BACKGROUND ART

Lithium-ion secondary batteries have a higher energy density than other secondary batteries and are operable at a high voltage. Therefore, they are used for information devices such as cellular phones, as being secondary batteries that can be easily reduced in size and weight, and nowadays there is also an increasing demand for the lithium-ion secondary batteries to be used as power sources for large-scale apparatuses such as electric vehicles and hybrid vehicles.

The lithium-ion secondary batteries have a cathode layer, an anode layer, and an electrolyte layer disposed between them. An electrolyte to be employed in the electrolyte layer is, for example, a non-aqueous liquid or a solid. When the liquid is used as the electrolyte (hereinafter, the liquid being referred to as an "electrolytic solution"), it permeates into the cathode layer and the anode layer easily. Therefore, an interface can be formed easily between the electrolytic solution and active materials contained in the cathode layer and the anode layer respectively, and the battery performance can be easily improved. However, since commonly used electrolytic solutions are flammable, it is necessary to mount a system to ensure safety. On the other hand, since solid electrolytes are nonflammable, the above system can be simplified. As such, lithium-ion secondary batteries having a layer containing a nonflammable solid electrolyte have been suggested.

As a technique related to such lithium-ion secondary batteries, Patent Document 1 for example describes a bipolar secondary battery module having a bipolar secondary battery element sealed in an exterior material, the bipolar secondary battery element having a lamination, in series, of at least two or more layers of bipolar electrodes with an electrolyte layer disposed therebetween, the bipolar electrodes each having a cathode formed on one face of a current collector and an anode formed on the other face of the current collector, wherein a member having a tensile stress higher than that of the exterior material is inserted in between the bipolar secondary battery element and the exterior material.

CITATION LIST

Patent Literature

Patent Document 1: Japanese Patent Application Laid-Open No. 2008-140633

SUMMARY OF THE INVENTION

Problems to be Solved by the Invention

Patent Document 1 described above discloses a battery having: a single cell formed by laminating a cathode layer, an electrolyte layer, and an anode layer; a sealing portion disposed on a perimeter of the single cell in a cross-sectional view of the single cell in a direction orthogonal to the lamination direction; and a pair of current collectors sandwiching the single cell and the sealing portion. Arranging the sealing portion in this manner makes it possible to insulate between the adjacent current collectors. However, in the case of sealing the battery thus configured in the exterior material under a reduced pressure as disclosed in Patent Document 1, the gas in the exterior material may not be removed fully when depressurizing a space enclosed by the exterior material (hereinafter referred to as "inside of the exterior material"). It is because the gas in a space surrounded by the sealing portion (insulator) cannot be discharged due to hindrance to the flow of the gas by the sealing portion that is disposed on an outer periphery of the single cell.

If gas remains in the exterior material as described above, such problems as expansion of the gas in the exterior material upon heat generation and reaction between the gas in the exterior material and the constituents of the battery, are likely to occur.

Accordingly, an object of the present invention is to provide: a solid battery which has been sealed in an exterior material under a reduced pressure, wherein gas in the exterior material can be fully removed when depressurizing the inside of the exterior material; and a method for manufacturing the solid battery.

Means for Solving the Problems

In order to solve the above problems, the present invention takes the following configuration.

A first aspect of the present invention is a solid battery having a single cell having: a laminated body having a cathode layer, an anode layer, and an electrolyte layer disposed between the cathode layer and the anode layer; an insulating part disposed on an outer perimeter of the laminated body in a cross-sectional view of the laminated body in a direction orthogonal to a lamination direction thereof; and a pair of current collectors sandwiching the laminated body and the insulating part, wherein the single cell has been sealed in an exterior material under a reduced pressure; and the insulating part has vent holes.

Herein, the "vent holes" refer to holes that allow gas in the exterior material to pass through when the inside of the exterior material is depressurized in a manufacturing process of the solid battery of the present invention.

In the solid battery of the first aspect of the present invention, the vent holes of the insulating part have preferably been closed up.

Herein, the expression that "the vent holes have been closed up" means that the vent holes, which allow gas to pass through before manufacture of the solid battery of the present invention, are closed up to thereby lose the characteristic to allow gas to pass through. The "characteristic to allow gas to pass through" refers to a characteristic of allowing gas to pass from one space to another space separated by the insulating part. Usually, even when a member having such vent holes is pressurized, heated, or the like to close up the vent holes, the evidence that the vent holes used to exist can be found.

The solid battery of the first aspect of the present invention may have a plurality of single cells described above sealed in the exterior material under a reduced pressure.

A second aspect of the present invention is a method for manufacturing a solid battery including the steps of: making a single cell having: a laminated body having a cathode layer, an anode layer, and an electrolyte layer disposed between the cathode layer and the anode layer; an insulating part having vent holes, the insulating part being disposed on an outer perimeter of the laminated body in a cross-sectional view of the laminated body in a direction orthogonal to a lamination direction thereof; and a pair of current collectors sandwiching the laminated body and the insulating part; sealing the single cell in an exterior material under a reduced pressure; and closing up the vent holes of the insulating part.

Herein, the expression "closing up the vent holes" means removing the characteristic of the vent holes to allow gas to pass through.

Effects of the Invention

According to the present invention, there can be provided: a solid battery which has been sealed in an exterior material under a reduced pressure, wherein gas in the exterior material can be fully removed when depressurizing the inside of the exterior material; and a method for manufacturing the solid battery.

MODE FOR CARRYING OUT THE INVENTION

The functions and the benefits of the present invention described above will be apparent from the following modes for carrying out the invention. Hereinafter, the present invention will be described based on the embodiments shown in the accompanying drawings, but is not limited to these embodiments. In the drawings, for convenience in showing the views and making them easy to understand, the scale, the dimensional ratio of length and width, etc. are sometimes adequately modified from actual ones to highlight the views. In each view, the same components are given the same reference numerals. Moreover, in some cases, in order to make the views easy to see, the views are simplified, the repeating reference numerals are partially omitted, or components not described in detail are not shown.

In the descriptions of the present invention given below, an embodiment in which the solid battery of the present invention is a lithium-ion secondary battery having a solid electrolyte layer will be mainly shown.

Figure 1:
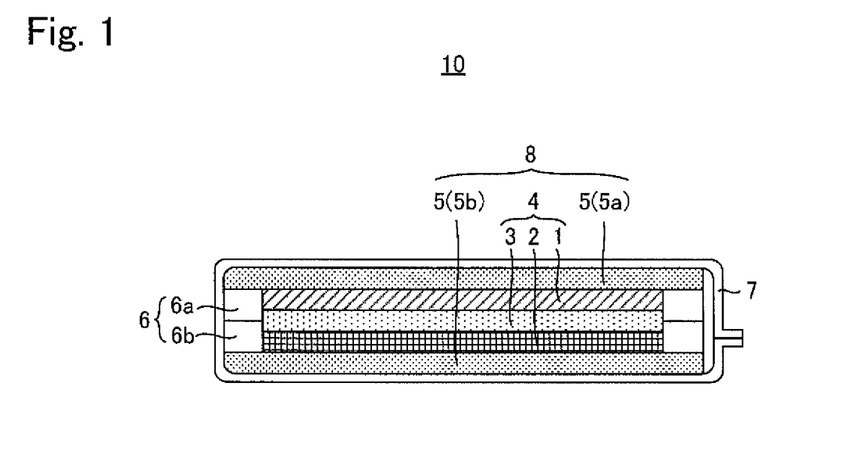
FIG. 1 is a cross-sectional view schematically showing a solid battery 10 of the present invention according to one embodiment.

FIG. 1 is a cross-sectional view schematically showing a solid battery 10 of the present invention according to one embodiment. The vertical direction of the drawing sheet of FIG. 1 is a lamination direction.

As shown in FIG. 1, the solid battery 10 has a single cell 8 having: a laminated body 4 having a cathode layer 1, an anode layer 2, and an electrolyte layer 3 disposed between the cathode layer 1 and the anode layer 2; an insulating part 6 disposed on an outer perimeter of the laminated body 4 in a cross-sectional view of the laminated body 4 in a direction orthogonal to the lamination direction thereof; and a pair of current collectors 5, 5 sandwiching the laminated body 4 and the insulating part 6. The single cell 8 has been sealed in an exterior material 7 under a reduced pressure. In the descriptions below of the solid battery 10, the current collector 5 which is in contact with the cathode layer 1 is sometimes referred to as a current collector 5a, and the current collector 5 which is in contact with the anode layer 2 is sometimes referred to as an anode current collector 5b. Further, in the solid battery 10, the insulating part 6 is constituted by a first insulating layer 6a and a second insulating layer 6b; and a part of the insulating part 6 on the cathode current collector 5a side is sometimes referred to as the first insulating layer 6a and a part of the insulating part 6 on the anode current collector 5b side is sometimes referred to as the second insulating layer 6b. The solid battery 10 also has a cathode terminal 8a connected to the cathode current collector 5a (see FIG. 3A) and an anode terminal 8b connected to the anode current collector 5b (see FIG. 3B).

(Cathode Current Collector 5a, Anode Current Collector 5b)

In the solid battery 10, the cathode current collector 5a and the anode current collector 5b may be constituted by a known conductive material that can be used as a cathode current collector or an anode current collector of a lithium-ion secondary battery. Examples of such a conductive material are metal materials containing one or more elements selected from the group consisting of Cu, Ni, Al, V, Au, Pt, Mg, Fe, Ti, Co, Cr, Zn, Ge, and In. In addition, the cathode current collector 5a and the anode current collector 5b may be in the form of a metal foil, a metal mesh, or the like, for example.

—(Insulating Part 6)

The insulating part 6 is constituted by the first insulating layer 6a and the second insulating layer 6b. The first insulating layer 6a and the second insulating layer 6b each has vent holes that have been closed up. The "vent holes that have been closed up" refer to holes which had allowed gas to pass through before manufacture of the solid battery 10 and which have been closed up in a manufacturing process of the solid battery 10 as described below and thereby lose the characteristic to allow gas to pass through. The "characteristic to allow gas to pass through" refers to a characteristic of allowing gas to pass from one space to another space separated by the insulating part. Usually, even when a member having such vent holes is pressurized, heated, or the like to close up the vent holes, the evidence that there used to exist the vent holes can be found. The vent holes of a member used for the first insulating layer 6a and the second insulating layer 6b are preferably in such a size that allows gas in the exterior material 7 (a space surrounded by the insulating part 6) to pass through when depressurizing the inside of the exterior material 7 in the manufacturing process of the solid battery 10 described below, and that enables the vent holes to be closed up by pressurizing and/or heating the member. Exemplary configurations of such vent holes include holes formed of a sequence of bubbles, and linear through-holes. The first insulating layer 6a and the second insulating layer 6b as above have gas permeability and can lose it by being pressurized and/or heated, or by some other means. The insulating layers may be constituted by a known insulating material that can endure an environment in which the solid battery 10 is used. Examples of such an insulating material include polyurethane sponges, polyamide-imide resins, epoxy resins, and fluororesins having an open-cell structure.

(Cathode Layer 1)

As a cathode active material to be contained in the cathode layer 1, a known active material that can be contained in a cathode layer of a lithium-ion secondary battery may be adequately employed. Examples of such a cathode active material include lithium cobalt oxide ($LiCoO_2$). As an electrolyte to be contained in the cathode layer 1, a known electrolyte that can be contained in a cathode layer of a battery may be adequately employed. Examples of such an electrolyte include: inorganic solid electrolytes including oxide solid electrolytes such as $Li_3PO_4$, $Li_3PS_4$, and sulfide solid electrolytes made by mixing $Li_2S$ and $P_2S_5$ such that the ratio thereof is $Li_2S:P_2S_5$=50:50 to 100:0 (for example, sulfide solid electrolytes made by mixing $Li_2S$ and $P_2S_5$ such that the ratio thereof is $Li_2S:P_2S_5$=75:25 at a mass ratio); and organic solid electrolytes such as polyethylene oxide. In addition, the cathode layer 1 may contain a binder to bind the cathode active material and the electrolyte and a conductive material to improve the conductivity. Examples of the binder that can be contained in the cathode layer 1 include butylene rubber. Examples of the conductive material that can be contained in the cathode layer 1 include carbon black. In addition, as a solvent to be used in making the cathode layer 1, a known solvent that can be used in preparing a slurry for making a cathode layer of a lithium-ion secondary battery may be adequately employed. Examples of such a solvent include heptane.

(Anode Layer 2)

As an anode active material to be contained in the anode layer 2, a known active material that can be contained in an anode layer of a lithium-ion secondary battery may be adequately employed. Examples of such an active material include graphite. As an electrolyte to be contained in the anode layer 2, a known electrolyte that can be contained in an anode layer of a lithium-ion secondary battery may be adequately employed. Examples of such an electrolyte include inorganic solid electrolytes and organic solid electrolytes described above that can be contained in the cathode layer 1. In addition, the anode layer 2 may contain a binder to bind the anode active material and the electrolyte and a conductive material to improve the conductivity. Examples of the binder and the conductive material that can be contained in the anode layer 2 include the binder and the conductive material described above that can be contained in the cathode layer 1. In addition, examples of a solvent to be used in making the anode layer 2 include the solvent described above that can be used in making the cathode layer 1.

(Solid Electrolyte Layer 3)

Examples of an electrolyte to be contained in the solid electrolyte layer 3 include the inorganic solid electrolytes and the organic solid electrolytes described above that can be contained in the cathode layer 1. In addition, examples of a solvent to be used in making the solid electrolyte layer 3 include the solvent described above that can be used in making the cathode layer 1.

(Exterior Material 7)

As the exterior material 7, any material that can endure an environment in which a lithium-ion secondary battery is used, that does not allow gas or liquid to pass through, and that can be sealed, may be employed without particular limitations. Examples of such a material to constitute the exterior material 7 include known metal foils represented by aluminum foil and the like; films made of resins represented by polyethylene, polyvinyl fluoride, polyvinylidene chloride, and the like; and metal-deposited films made by depositing metals such as aluminum onto the above films. Although FIG. 1 shows an embodiment in which the exterior material 7 is constituted by one bag-shaped member, the exterior material 7 may be configured in a manner to wrap the single cell 8 with two films thereof sandwiching the single cell 8, or the exterior material 7 may be constituted by a plurality of members.

(Cathode Terminal 8a, Anode Terminal 8b)

The cathode terminal 8a and the anode terminal 8b may be constituted by a material which has favorable electrical conductivity and can endure an environment in which the solid battery 10 is used, and it is preferably constituted by a material which has flexibility and strength sufficient to cope with force applied during use of the solid battery 10. For example, as shown in FIG. 3, the cathode current collector 5a may be formed such that a part thereof projects, to use the projected portion as the cathode terminal 8a, and the anode current collector 5b may be formed such that a part thereof projects, to use the projected portion as the anode terminal 8b.

Although a method for manufacturing the solid battery 10 described above is not particularly limited, the solid battery 10 may be manufactured through the following steps, for example.

FIGS. 2A to 2E are views illustrating the manufacturing steps of the solid battery 10. FIG. 3A is a view taken along IIIA-IIIA of FIG. 2A and seen in the direction of the arrows. FIG. 3B is a view taken along IIIB-IIIB of FIG. 2A and seen in the direction of the arrows. The vertical direction of the drawing sheet of FIGS. 2A to 2E and the back-front direction of the drawing sheet of FIGS. 3A and 3B are the lamination direction.

Figure 2A:
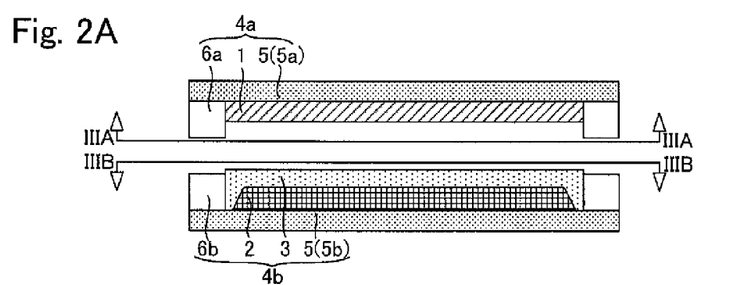
FIGS. 2A to 2E are views illustrating manufacturing steps of the solid battery 10.
Figure 3A:
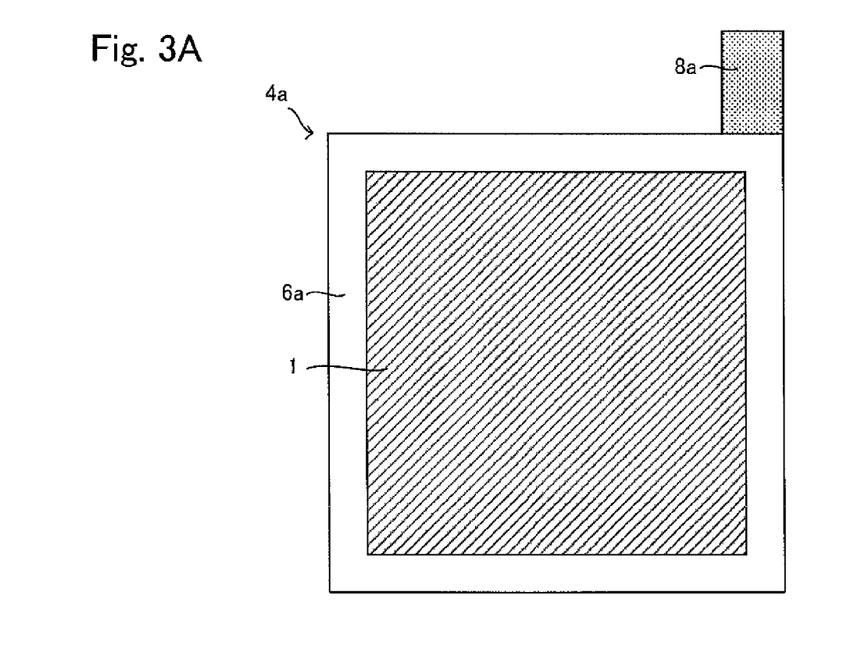
FIG. 3A is a view taken along IIIA-IIIA of FIG. 2A and seen in the direction of the arrows.
Figure 3B:
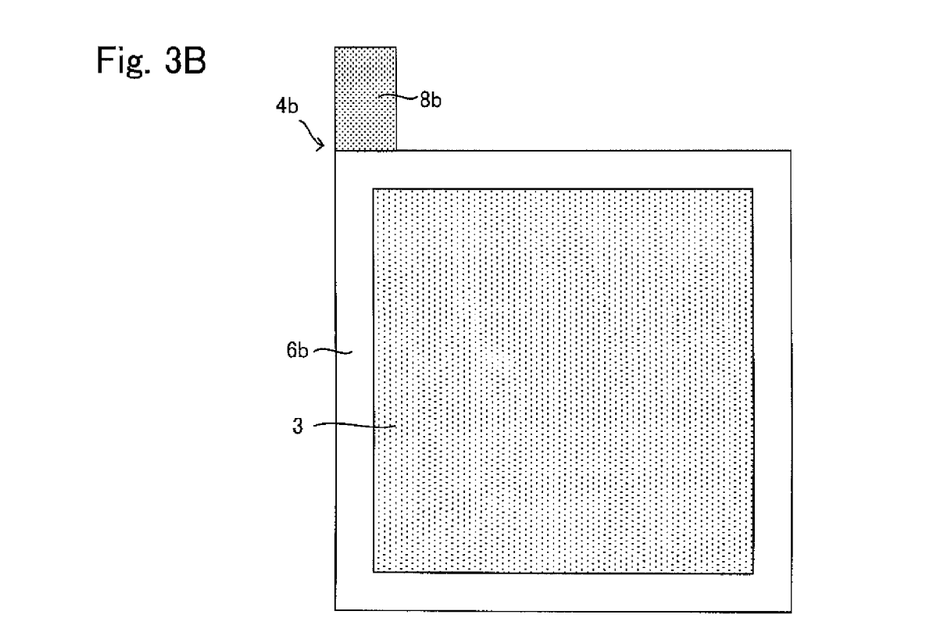
FIG. 3B is a view taken along IIIB-IIIB of FIG. 2A and seen in the direction of the arrows.

As shown in FIGS. 2A and 3A, the first insulating layer 6a is formed, by a known method such as thermal compression bonding, on an outer edge of the cathode current collector 5a to which the cathode terminal 8a is connected. After the first insulating layer 6a is formed, a masking material is put on a surface of the first insulating layer 6a Then, the cathode layer 1 is formed on a surface of the cathode current collector 5a surrounded by the first insulating layer 6a. The cathode layer 1 can be formed for example by applying, by a known method such as a doctor blade method, a cathode slurry made by dispersing at least a cathode active material and a solid electrolyte into a solvent onto the entire surface of the cathode current collector 5a surrounded by the first insulating layer 6a, and volatilizing the solvent. In this manner, a first laminated body 4a having the cathode layer 1, the cathode current collector 5a, and the first insulating layer 6a can be made, as shown in FIGS. 2A and 3A.

On the other hand, as shown in FIGS. 2A and 3B, the second insulating layer 6b is formed, by the same known method as in the case of forming the first insulating layer 6a, on an outer edge of the anode current collector 5b to which the anode terminal 8b is connected. After the second insulating layer 6b is formed, a masking material is put on a surface of the second insulating layer 6b. Then, the anode layer 2 is formed on a surface of the anode current collector 5b surrounded by the second insulating layer 6b. The anode layer 2 can be formed by applying, by a known method such as a doctor blade method, an anode slurry made by dispersing at least an anode active material and a solid electrolyte into a solvent onto the entire surface of the anode current collector 5b surrounded by the second insulating layer 6b.

Once the anode layer 2 and the second insulating layer 6b are formed in the above manner, an electrolyte slurry made by dispersing at least a solid electrolyte into a solvent is applied on a surface of the anode layer 2 by a known method such as a doctor blade method, with the masking material put on the surface of the second insulating layer 6b, and the solvent is volatilized. Thereby the solid electrolyte layer 3 can be formed on the anode layer 2. In this manner, a second laminated body 4b having the anode layer 2, the anode current collector 5b, and the second insulating layer 6b can be made, as shown in FIGS. 2A and 3A.

Next, the masking materials of the first laminated body 4a and the second laminated body 4b made in the above manner are removed, and the first laminated body 4a and the second laminated body 4b are laminated in such a manner that the cathode layer 1 and the solid electrolyte layer 3 face each other as shown in FIG. 2A.

Figure 2B:
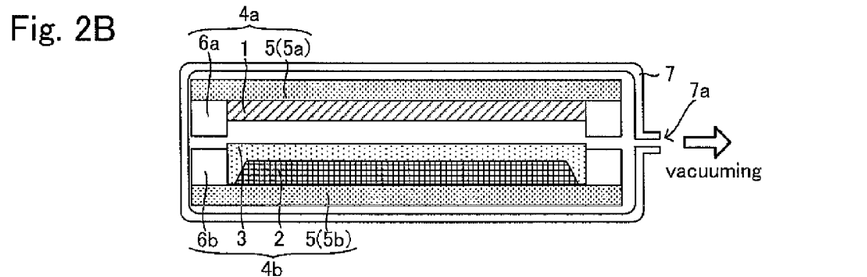

Thereafter, the first laminated body 4a and the second laminated body 4b are accommodated into the exterior material 7 having an outlet 7a for vacuuming, as shown in FIG. 2B. At this time, at least a part of the cathode terminal 8a and a part of the anode terminal 8b are kept from being accommodated in the exterior material 7. Then, the inside of the exterior material 7 is vacuumed (depressurized). The pressure of the vacuuming is not particularly limited, and may be about 0.1 MPa, for example.

Figure 2C:
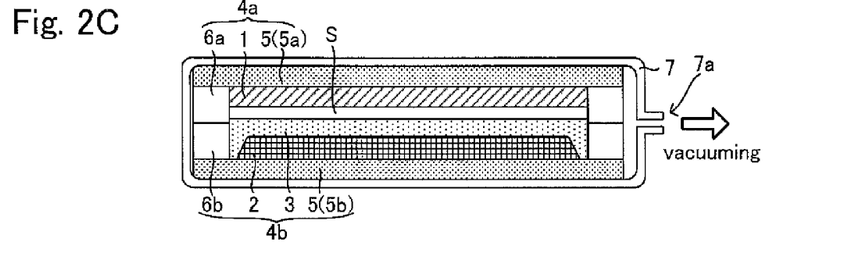

When the pressure inside the exterior material 7 is reduced as described above, the first laminated body 4a and the second laminated body 4b are pressurized by the exterior material 7. At this time, strong compressive force is more likely to be applied on an outer side (an outer perimeter side, an end portion in the right-and-left direction of FIG. 2B) of the first laminated body 4a and the second laminated body 4b than on an inner side (a central side, a central portion in the right-and-left direction of FIG. 2B) thereof viewed in the lamination direction thereof. Therefore, the first insulating layer 6a and the second insulating layer 6b are more easily compressed by the exterior material 7 than the cathode layer 1 and the solid electrolyte layer 3. As a result, a space S defined by the first insulating layer 6a, the second insulating layer 6b, the cathode layer 1, and the solid electrolyte layer 3 is formed, as shown in FIG. 2C.

At this time, if the first insulating layer 6a and the second insulating layer 6b do not have the vent holes as in the conventional solid batteries, gas in the space S cannot be removed fully. Consequently, the conventional solid batteries are likely to have such problems as expansion of the gas inside the exterior material upon heat generation, and reaction between the gas inside the exterior material and the battery components. Moreover, if the gas in the space S remains, an interface between the solid electrolyte layer and the cathode or anode layer may not be formed sufficiently, thereby likely leading to degradation of the battery performance. On the other hand, in the solid battery of the present invention, the first insulating layer 6a and the second insulating layer 6b have the vent holes, and thereby the gas in the space S can be removed fully as shown in FIG. 2D.

Figure 2D:
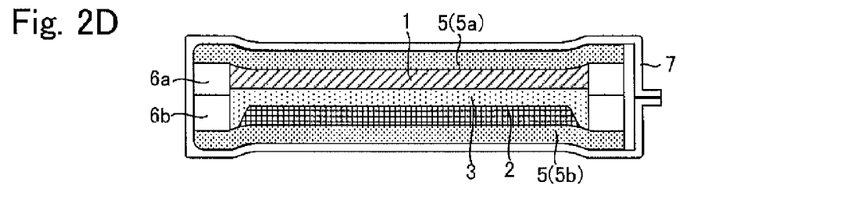
Figure 2E:
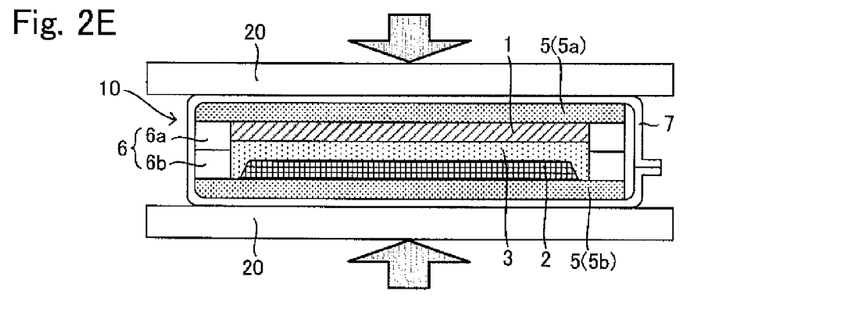

After the inside of the exterior material 7 is depressurized, the outlet 7a of the exterior material 7 can be sealed by thermal welding for example, as shown in FIG. 2D. Thereafter, the single cell is pressurized in the lamination direction using appropriate pressurizing members 20, 20, and thereby the solid battery 10 can be manufactured, as shown in FIG. 2E. In this pressurizing step, the vent holes of the first insulating layer 6a and the second insulating layer 6b are closed up. The pressure to be applied in this pressurizing step may be determined adequately in accordance with a configuration of the solid battery to be manufactured, and the like. The pressure may be 1 MPa or more and 500 MPa or less, for example. The way to close up the vent holes of the first insulating layer 6a and the second insulating layer 6b is not limited to the pressurizing. Heating or pressurizing while heating may be adopted to close up the vent holes of the first insulating layer 6a and the second insulating layer 6b.

In this way, according to the solid battery of the present invention, the gas inside the exterior material can be removed fully in the manufacturing process as described above, by constituting the insulating part with the insulating member having vent holes. As such, the solid battery of the present invention can prevent expansion of the gas inside the exterior material upon heat generation or the like, or can prevent reaction between the gas inside the exterior material and the battery components. Further, the solid electrolyte layer and the cathode or anode layer can be contacted with each other closely, leading to improvement of the battery performance. Furthermore, in the solid battery of the present invention, the current collectors can be insulated from each other by closing up the vent holes of the insulating portion in the manufacturing process as described above.

In the above descriptions on the present invention, an embodiment has been shown in which the insulating part 6 is constituted by the first insulating layer 6a formed on the cathode current collector 5a and the second insulating layer 6b formed on the anode current collector 5b in the manufacturing process. However, the solid battery of the present invention is not limited to the embodiment. For example, the insulating part may be constituted by one member, and in this case the insulating part may be formed only on the cathode current collector or the anode current collector in the manufacturing process.

In the above descriptions on the present invention, an embodiment has been shown in which the first insulating layer 6a is formed before the cathode layer 1 is formed and the second insulating layer 6b is formed before the anode layer 2 is formed. However, the solid battery of the present invention is not limited to the embodiment. For example, the insulating layer may be formed on an outer perimeter of the cathode layer after the cathode layer is formed on the current collector; the insulating layer may be formed on an outer perimeter of the anode layer after the anode layer is formed on the current collector; the insulating layer may be formed on an outer perimeter of the cathode layer and the solid electrolyte layer after the cathode layer and the solid electrolyte layer are formed on the current collector; or the insulating layer may be formed on an outer perimeter of the anode layer and the solid electrolyte layer after the anode layer and the solid electrolyte layer are formed on the current collector.

Figure 4:
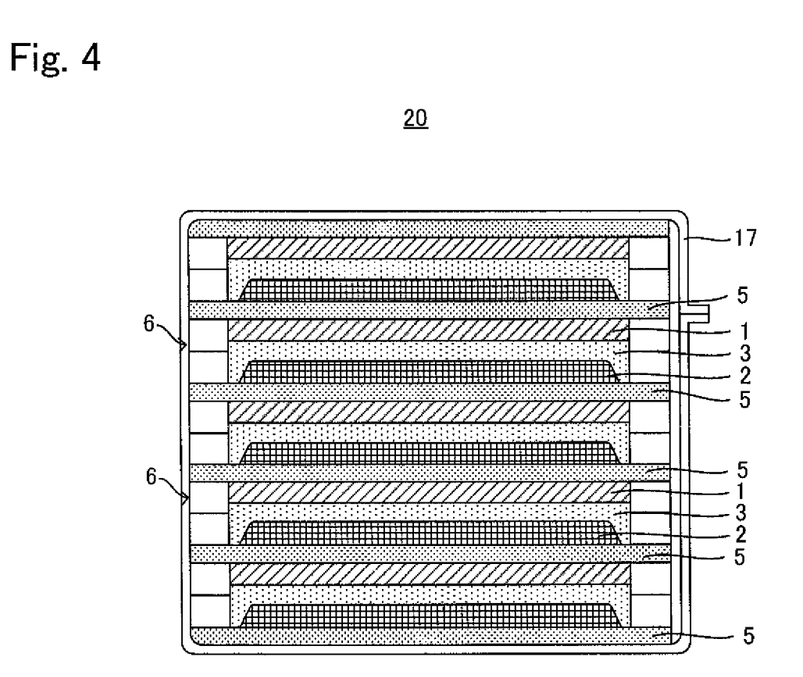
FIG. 4 is a cross-sectional view schematically showing a solid battery 20 of the present invention according to another embodiment.

In the above descriptions on the present invention, an embodiment has been shown in which one single cell 8 is accommodated in the exterior material 7, but the present invention is not limited to the embodiment. In the present invention, two or more single cells may be accommodated in one exterior material. FIG. 4 is a cross-sectional view schematically showing a solid battery 20 of the present invention according to another embodiment. The solid battery 20 having a plurality of single cells accommodated in the exterior material 17 may be made for example by preparing a plurality of bipolar electrodes each having the cathode layer 1 formed on one face of the current collector 5 and the anode layer 2 formed on the other face of the current collector 5, and disposing them with the electrolyte layer 3 therebetween, as shown in FIG. 4. In the manufacturing process of the solid battery 20, the method of forming the insulating part 6, the method of sealing the single cells in the exterior material 17 under a reduced pressure, and the like may be the same as in the case of the solid battery 10 described above.

In the above descriptions on the present invention, the single cell 8 having a substantially cuboid shape has been shown, but the single cell employed in the present invention is not limited to the shape. The single cell may have other shapes such as a columnar shape and a shape of hexagonal column.

In the above descriptions on the present invention, an embodiment has been shown in which the single cell 8 being a lithium-ion secondary cell is provided, but the cell that can be employed in the present invention is not limited to the configuration. The single cell in the present invention may be configured such that ions other than lithium ions move between the cathode layer and the anode layer. Examples of such ions include sodium ions and potassium ions. In a configuration where ions other than lithium ions move, a cathode active material, a solid electrolyte, and an anode active material may be adequately selected depending on the ions to move. The single cell in the present invention may also be a primary cell.

INDUSTRIAL APPLICABILITY

The solid battery of the present invention can be used as a power source for mobile devices, electric vehicles, hybrid vehicles, and the like.

DESCRIPTION OF THE REFERENCE NUMERALS

1 cathode layer
2 anode layer
3 solid electrolyte layer
4a first laminated body
4b second laminated body
4 laminated body
5 current collector
6 insulating part
6a first insulating layer
6b second insulating layer
7 exterior material
8 single cell
10 solid battery
17 exterior material
20 solid battery

The invention claimed is:

1. A method for manufacturing a solid battery comprising the steps of:
    making a single cell comprising: a laminated body having a cathode layer, an anode layer, and an electrolyte layer disposed between the cathode layer and the anode layer; at least one insulating layer having vent holes formed of a sequence of bubbles and having a characteristic of allowing gas to pass through, the at least one insulating layer being disposed on an outer perimeter of the laminated body in a cross-sectional view of the laminated body in a direction orthogonal to a lamination direction thereof; and a pair of current collectors sandwiching the laminated body and the at least one insulating layer;
    sealing an exterior material that accommodates the single cell, an inside of the exterior material being under a reduced pressure; and
    after sealing the exterior material, pressurizing and/or heating the at least one insulating layer such that the vent holes are closed up and lose the characteristic of allowing gas to pass through, and the vent holes become evidence that vent holes used to exist.

* * * * *